Dec. 17, 1935.　　　A. B. SCHELL　　　2,024,809
PACKAGE FOR PERISHABLE PRODUCTS
Filed Dec. 18, 1933
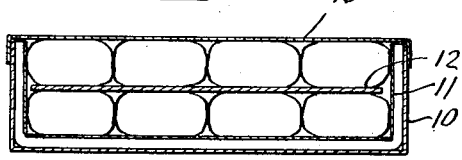
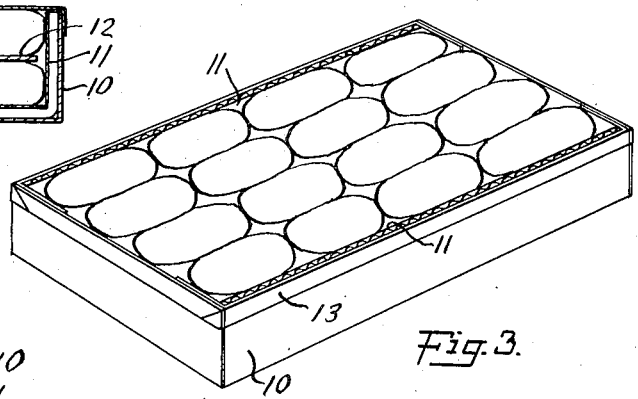
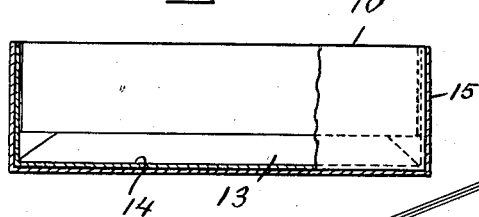
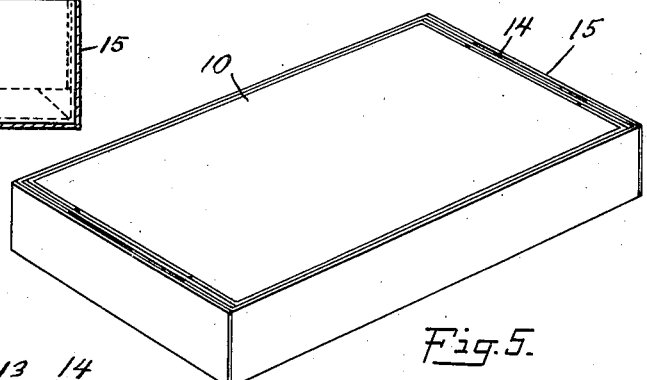
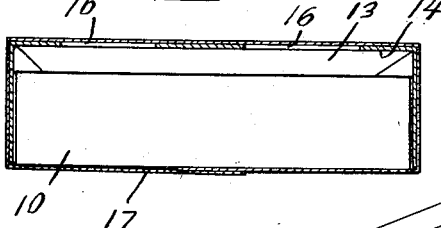
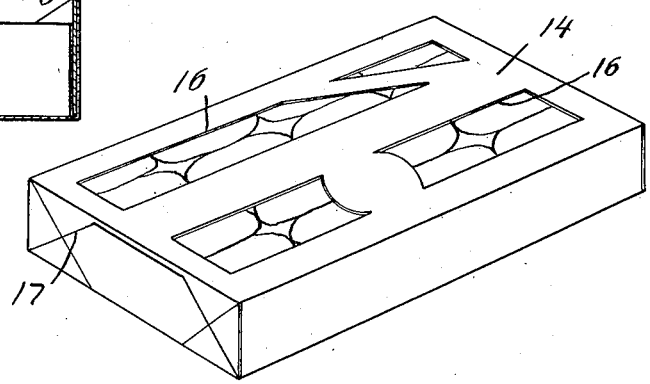
INVENTOR
Arthur B. Schell
BY
ATTORNEYS Patented Dec. 17, 1935

2,024,809

UNITED STATES PATENT OFFICE 2,024,809

PACKAGE FOR PERISHABLE PRODUCTS

Arthur B. Schell, Plainfield, N. J., assignor to The Hills Brothers Company, New York, N. Y., a corporation of New York Application December 18, 1933, Serial No. 702,849

5 Claims. (Cl. 99—11)

This invention relates to the distribution of food products which, when in condition for packaging, frequently carry pathogenic or disease-producing organisms injurious to the health of the consumer and also molds, yeasts, and the eggs, larvæ, pupæ, and adults of insects which produce fermentation of the products or attack and destroy them. More particularly, the invention is concerned with a novel method of packaging such products for distribution and sale, the new method making it possible to produce a retail package of the products which have been so treated after packaging, as by pasteurizing, that the pathogenic organisms, yeasts, molds, etc. have either been destroyed or rendered innocuous, the products continuing in this condition until the package is opened by the consumer. The invention also has to do with a new package of food products, the contents of which have been pasteurized, and continue in that condition up to the time of use.

Among the products which may be advantageously packaged according to the new method are dried fruits, such as dates, raisins, apricots, prunes, peaches, currants and figs, which when in condition for packaging contain micro-organisms of the kind above referred to in varying number. As it has been demonstrated by research that disease transmission can be effected by such fruits, the treatment of the fruits to render innocuous the organisms of a pathogenic character is a matter of grave concern to the public health, in view of the large annual consumption. Also, since the molds, yeasts, insects, etc. carried by the products are likely to result in injury to the products, it is evident that unless the molds, etc. are destroyed prior to the packages of the products being distributed, the products are likely to spoil in the hands of the distributors.

The treatment of the products in bulk and before they are packaged to destroy or render innocuous the micro-organisms referred to is not effective since instances have been found in which samples of the product in bulk have shown no intestinal bacteria, for example, although such organisms were found in the same products after being packaged. This indicates that contamination can occur during the placing of the products in the retail cartons, and it is, therefore, imperative for best results that the products be subjected to treatment after they have been placed in cartons and are otherwise ready for sale.

A treatment which is suitable for the purpose is that of pasteurizing, which is disclosed in Fellers Patent No. 1,870,802, issued August 9, 1932, and has been used with great success. According to this process, the products in their retail packages are subjected to relatively high temperatures in a humid atmosphere and this treatment destroys and renders innocuous the micro-organisms in the products and also those which may be carried by the container itself.

In the commercial application of the Fellers process, the retail cartons of the products are carried on a conveyor through a heating chamber or oven into which wet steam is introduced in order to maintain the atmosphere with the desired moisture content. While this treatment is highly effective against the micro-organisms, it is not permissible to subject all ordinary packages to the desired heat and humidity since some injury to the packages may result, particularly when these products are packaged in cartons wrapped in a transparent wrapping material, such as that commercially known as "Cellophane".

The present invention is accordingly directed to a method of packaging food products by which the products can be placed in a retail container and treated to destroy or render innocuous the micro-organisms carried by the products and the container without doing injury to the container or the products. The invention further comprehends a novel retail package for food products, which is of excellent appearance and which has been so treated as to pasteurize its contents and those parts of the package in contact therewith.

While the new method may be employed in connection with the packaging of products of various sorts, its use in the packaging of dates will be described in detail by way of explanation, although it is to be understood that the utility of the new method is not limited to that particular product. In the packaging of dates, the dates which have been given the usual preliminary treatment are placed in a carton member or section which is preferably provided with a suitable liner. This member has an opening through which the contents are visible and after the member has been filled, the dates exposed through the opening are covered with a sheet of transparent material which is substantially unaffected by heat and humidity. The filled carton member with the sheet in place is then subjected to the pasteurizing treatment, and if a two-part carton is used, the complementary section is placed in position before the treatment.

Upon completion of the treatment, the carton with the sheet in place is enclosed in a suitable wrapping and is ready for shipment.

For a better understanding of the invention, reference may be had to the accompanying drawing, in which Figure 1 is a view in perspective of a carton member with its filling of dates;

Figure 2 is a cross-sectional view of the carton member shown in Figure 1;

Figure 3 is a perspective view of a carrier used in the processing of the carton;

Figure 4 is a partial sectional view showing the use of the carrier; and

Figures 5 and 6 are perspective and sectional views, respectively, of the finished package.

A package of the perishable products embodying the features of the invention may have various forms and one form which has proven successful commercially is of sufficient size to hold about 7¼ oz. net weight of the products. This carton may be of different constructions but I prefer to use a two-part carton which has one or more openings through which the contents may be inspected.

The carton shown is of the two-part variety and the products are placed in the lower section 10 of the carton. This section is provided with a liner 11 which keeps the products from contact with the inner surface of the carton and may be of any suitable material, such as a fluted waxed paper. The specific carton section shown is relatively shallow and the dates are placed in it in two layers with a partition sheet 12 between them. After the section has been filled, its open top is covered by a sheet 13 of transparent material and the edges of the sheet are folded to overlap the sides of the carton section and, if desired, may also be turned down over the ends.

As the filled carton section is to be subjected to a pasteurizing treatment involving the use of heat and humidity, it is important that the thin transparent sheet 13 should be substantially unaffected by heat and moisture and not become shrunk or wrinkled thereby. I have found that a transparent sheet of cellulose acetate is suitable for the purpose, this material being commercially known as "Protectoid". A sheet of this material permits moisture to reach the dates, and it withstands the pasteurizing treatment satisfactorily and is not affected thereby to such an extent as to injure the appearance of the completed package.

The complementary carton section 14 is then placed on the filled section to overlie the transparent sheet and the completed carton is placed in a carrier 15 made of cardboard or the like and used repeatedly in the processing of the packages. This carrier serves as a means for holding the carton and keeping it from becoming soiled or defaced by contact with the conveyor on which it is carried through the heating chamber.

The pasteurizing treatment preferred is that described in the Fellers Patent No. 1,817,802 and by the use of this treatment, the dates, the cartons, the liner and the transparent sheet are all subjected to the action of heat and humidity under such conditions as to destroy or render innocuous micro-organisms carried thereby. At the completion of the pasteurizing treatment, the carton is removed from the carrier and is enclosed in a wrapping which is preferably of a transparent material. The material commercially known as "Cellophane" is preferred for the purpose and it is preferable to use a moisture-proof type of this material so that the moisture contained within the dates and imparted thereto during the pasteurizing treatment will not be entirely lost.

With the new method described, a package is produced which contains pasteurized food products and the products remain in this condition until the time of use. The package has an attractive appearance and the transparent sheet which covers the products exposed through the carton openings has not been detrimentally affected by the pasteurizing treatment.

It would not be possible to obtain the same results by treatment of the package in its final form and with the outer wrapping in place, even if this wrapping were made of cellulose acetate material. Although that material is better able to withstand the pasteurizing treatment than transparent sheet material of other types, it is still somewhat affected by heat and moisture and an outer wrapper even of cellulose acetate would not have the desired attractive appearance. Also since it is not moisture-proof it would permit the products to give up their moisture and dry out. In the package produced as described, only the small transparent sheet is exposed to heat and humidity in the pasteurizing treatment and the outer moisture-proof wrapping applied after the treatment is completed insures that the moisture imparted to the dates during the treatment will be restrained thereby and the dates will thus remain in a fresh moist condition until the time of use.

What I claim:

1. A method of packaging food products which comprises placing the products in a carton having an opening, applying to said carton to overlie said opening a sheet of transparent material substantially unaffected by heat and moisture and permitting moisture to pass through it, subjecting the carton with the products therein to heat and humidity sufficient to pasteurize said products, and enclosing the carton in a moisture-proof wrapping.

2. A method of packaging food products which comprises placing the products in a carton having an opening, covering the products exposed at said opening by a transparent sheet substantially unaffected by heat and moisture and permitting moisture to pass through it, mounting a complementary carton section on said filled section to complete the carton, subjecting the carton to heat and humidity sufficient to pasteurize said products, carton and sheet, and enclosing said carton in a moisture-proof transparent wrapping.

3. A package containing food products which comprises a carton having an opening and containing a quantity of said products, a sheet covering said opening, said sheet being of a transparent material substantially unaffected by heat and moisture and permitting moisture to pass through it, a complementary carton section mounted on said first section and having an opening registering with the first opening, and a moisture-proof wrapping enclosing said sections.

4. A package for food products which comprises a container holding a quantity of said products and having an opening, a transparent sheet covering said opening, said sheet being substantially unaffected by heat and moisture and permitting moisture to pass through it, said container, products, and sheet being pasteurized, and a moisture-proof wrapping enclosing the container.

5. A package for food products which comprises a container having an opening, a liner in said container, said liner containing a quantity of said products, a sheet of transparent material covering said opening, said material being substantially unaffected by heat and moisture and permitting moisture to pass through it, said container, liner, sheet, and products being in pasteurized condition, and a wrapping of moisture proof material enclosing the container and its contents.

ARTHUR B. SCHELL.